June 13, 1944. J. F. LINDEN 2,351,136
HOE
Filed March 10, 1941

Inventor
J. F. Linden
By George P. Mackie
ATTY.

Patented June 13, 1944

2,351,136

UNITED STATES PATENT OFFICE 2,351,136

HOE

John Ferdinand Linden, Caledon, Ontario, Canada

Application March 10, 1941, Serial No. 382,592

5 Claims. (Cl. 97—66)

This invention relates to hoes used by gardeners and farmers for cultivating the soil, cutting and pulling weeds and superfluous plants, and similar purposes, and the object of my invention is to devise a hoe with a working blade in which the combined parts may be used for all the purposes of the common hoe, but which is adaptable as well for use as a scraper for levelling off soil, for weeding and for thinning row crops such as turnips, beets, mangolds, and corn, and other purposes requiring an accessible and accurate cut for which the ordinary hoe is not well adapted.

Figure 1:
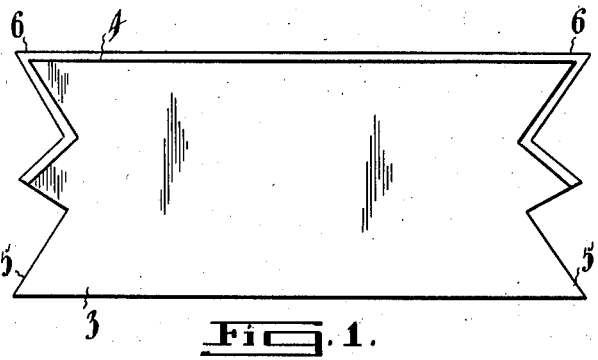
Figure 5:
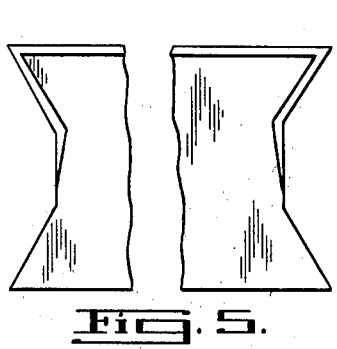
Figure 2:
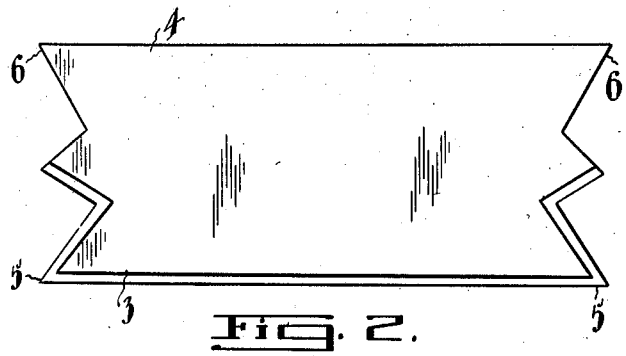
Figure 6:
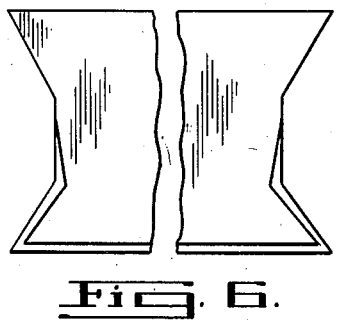
Figure 3:
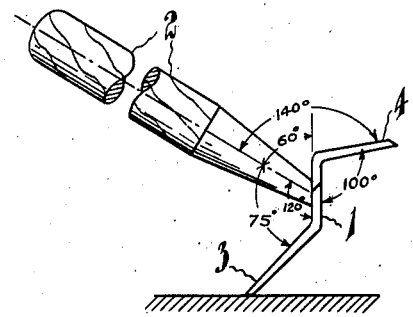
Figure 4:
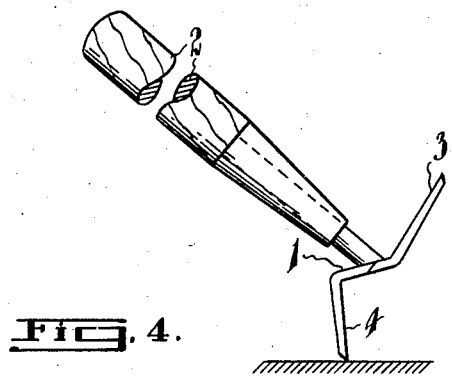

I attain my object by means of the construction hereinafter more particularly described and illustrated in the accompanying drawing in which Fig. 1 is a plan view of the blank from which the hoe is formed;

Fig. 2 a similar view of the opposite face of the blank;

Fig. 3 a side view of the hoe as used for ordinary cultivating purposes;

Fig. 4 a similar view of the hoe as used for levelling purposes;

Fig. 5 a partial plan view of a modified form of blank;

Fig. 6 a similar view showing the opposite face of the blank shown in Fig. 5.

In the drawing like numerals of reference indicate corresponding parts in the different figures.

Referring to Figs. 1 and 2, it will be seen that the hoe is formed from a sheet of flat steel specially bent up to the form shown in end elevation in Figs. 3 and 4. The hoe includes a head portion 1 to which the handle 2 is preferably secured.

Extending from one side of the head is a rearwardly inclined cutting flange or blade portion 3 while from the other side of the head extends a forwardly inclined cutting flange or blade portion 4. The working edges of the blade portions 3 and 4 are therefore parallel to one another. For convenience in reference, these oppositely disposed blade portions 3 and 4 are hereinafter referred to as the cultivating blade and levelling blade respectively. The cultivating blade, it will be noted, is directed at an angle of approximately 135° to the adjacent face of the head, while the levelling blade is directed at an angle of approximately 100° to the adjacent face of the head. The shank of the handle is secured to the cultivating blade side of the hoe and is inclined at approximately an angle of 120° to the plane of the face of the head, or approximately 75° to the adjacent face of the cultivating blade, and approximately 140° to the adjacent face of the levelling blade.

It will be seen, therefore, that in use for cultivating purposes as shown in Fig. 3, the head is substantially vertical while the cultivating blade is rearwardly inclined, while when the hoe is used for levelling purposes as shown in Fig. 4, the head is in substantially horizontal position, while the levelling blade is inclined slightly forwardly.

It will be noted that when used in this manner the head acts as a stop to prevent excessive digging of the hoe into the soil and thus acts as a guide in the levelling operation.

As stated in the preamble of the specification, it is desired to adapt the hoe for pulling or cutting weeds, and also for removing weeds which are located in very close proximity to plants. The ends of the hoe are therefore specially shaped to provide convenient and efficient weed engaging and cutting surfaces. I therefore, as will be seen in Figs. 1 and 2, notch each end of the blanks to form a pair of V-shaped recesses having the bottoms of the recesses at the bends between the head and cultivating and levelling blades. The sides of the notch adjacent the longitudinal edges of the blades are arranged at substantially 60° to the said longitudinal edge.

It will be noted that the front face of the cultivating blade is bevelled off along the longitudinal edge and side edges to provide cutting edges, while the rearward face of the levelling blade is bevelled off along the longitudinal edge and side edges.

It will be noted that in the modification shown in Figs. 5 and 6 the ends of the blades are provided with a single wide recess, thus forming twin spaced projections instead of three as in Figs. 1 and 2.

An important feature of the present invention is the head 1 and the angle of supporting the handle in relation thereto, so that when the cultivating blade is lowermost, the latter is in proper working position, and when the levelling blade is lowermost, the latter is not only also in proper working position, but the head is in position to act as a guide for levelling purposes.

The means for connecting the handle 2 to the operating blade may be of the type shown in Fig. 4 in which the end of the wooden handle is provided with a tapered metal tubular ferrule into which the shank projects, or it may be of the type shown in Fig. 3 in which a socket is integrally joined with the operating blade to receive the end of the wooden handle.

From the foregoing it will be noted that the side edges of the oppositely inclined cutting flanges 3 and 4 are disposed at acute angles to the longitudinal edges. This arrangement in conjunction with the described form of angularly related plane surfaces provides a novel combination of features, rendering the hoe highly efficient for the purposes already set forth. It will be apparent therefore that when the hoe is turned on either end the rearwardly inclined corner 5 of the cutting flange 3 and the forwardly inclined corner 6 of the cutting flange 4, when operated by either pulling and pushing movements, the divergence of the angling of the edge surfaces, as well as the plane surfaces, in relation to the head 1, will bring the head in a position to serve as a stop, towards which the weeds and surplus plants will be urged and readily cut and removed out of the line of crops.

Although the handle is shown in the drawings secured to the head portion 1 of the hoe, it may be secured to either the blade 3 or the blade 4. The angling of the side edges of the cutting blades relative to the longitudinal edges may be varied, depending on the special purposes for which the hoe is constructed, the principal feature of the invention being the arrangement of the divergently directed plane surfaces of the described cutting flanges in conjunction with the oppositely disposed levels of the longitudinal as well as the side cutting edges.

These mentioned and other minor changes in construction may be made without departure from the spirit and scope of the invention as expressed in the accompanying claims.

What I claim as my invention is:

1. In a hoe, an operating blade comprising in combination, an intermediate head and a bevelled transversely disposed rearwardly inclined cutting flange extending from one longitudinal margin of the head and a second bevelled transversely disposed forwardly inclined cutting flange extending from the opposite longitudinal margin of the head; the plane of the first mentioned cutting flange being disposed at a greater angle to the plane of the head than the second mentioned cutting flange; each of said cutting flanges having its end edges inclined inwardly at an acute angle to the longitudinal edge and merging with the adjacent end of the head.

2. In a hoe, an operating blade comprising in combination an intermediate head portion and a bevelled transversely disposed rearwardly inclined cutting flange extending from one longitudinal margin of the head and a second bevelled transversely disposed forwardly inclined cutting flange extending from the opposite longitudinal margin of the head; the end edges of each cutting flange being bevelled and outwardly inclined from the respective end of the head, and at an acute angle with the longitudinal edge of each cutting flange; the bevels of the cutting edges being disposed so that the longitudinal edge and inclined side edges of the rearwardly inclined cutting flange are bevelled on the forward face, and the longitudinal edge and inclined side edges of the forwardly cutting flange are bevelled from the opposite or rearward face.

3. In a hoe, an operating blade as described in claim 2, in which the rearwardly inclined cutting flange is disposed at a greater angle in relation to the plane of the head than the forwardly inclined cutting flange.

4. In a hoe, an operating blade comprising in combination an intermediate head, a bevelled transversely disposed and rearwardly inclined cutting flange extending from one longitudinal margin of the head, and a second bevelled transversely disposed forwardly inclined cutting flange extending from the opposite longitudinal margin of the head, the bevels of the cutting edges being disposed so that the longitudinal edge and side edges of the rearwardly inclined cutting flange are bevelled from the forward face, and the longitudinal edge and side edges of the forwardly inclined cutting flange are bevelled from the opposite or rearward face, the plane of the first mentioned cutting flange being disposed at a greater angle to the plane of the head than the second mentioned cutting flange.

5. In a hoe, an operating blade comprising in combination, an intermediate head, a bevelled transversely disposed and rearwardly inclined cutting flange extending from one longitudinal margin of the head, said cutting flange having its side edges inclined inwardly at an acute angle to the longitudinal edge and merging with the adjacent end of the head, said operating blade having a second bevelled transversely disposed, forwardly inclined cutting flange extending from the opposite longitudinal margin of the head, the bevels of the cutting edges being disposed so that the longitudinal edge and inclined side edges of the rearwardly inclined cutting flange are bevelled from the forward face, and the longitudinal edge and side edges of the forwardly inclined cutting flange are bevelled from the opposite or rearward face.

JOHN F. LINDEN.